United States Patent Office 2,971,741
Patented Feb. 14, 1961

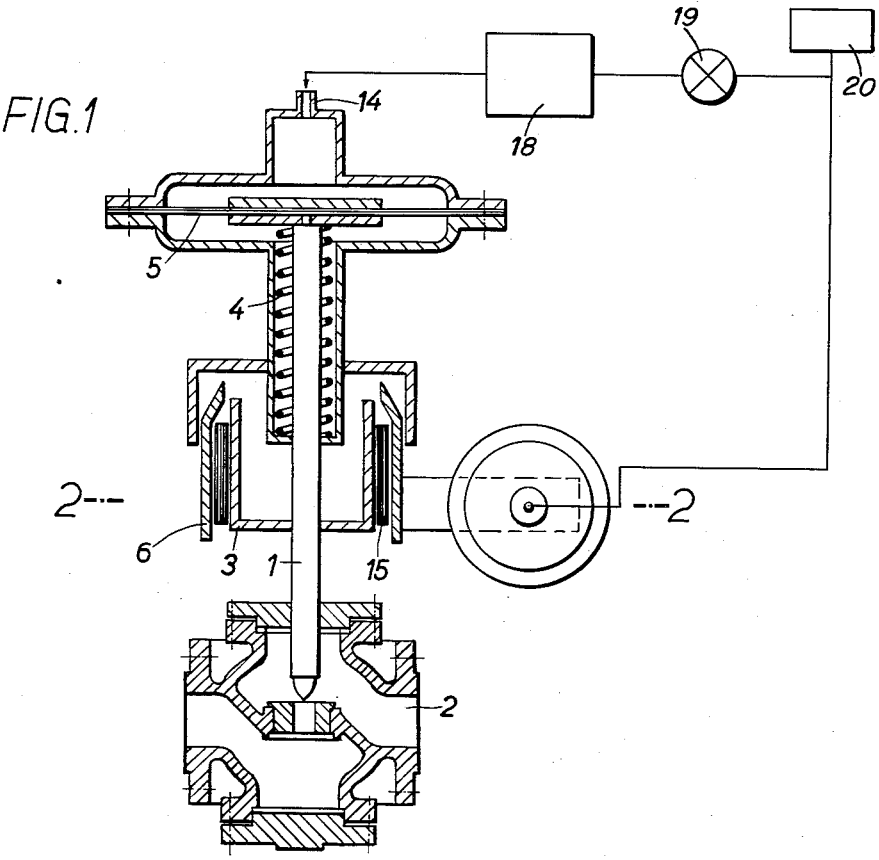
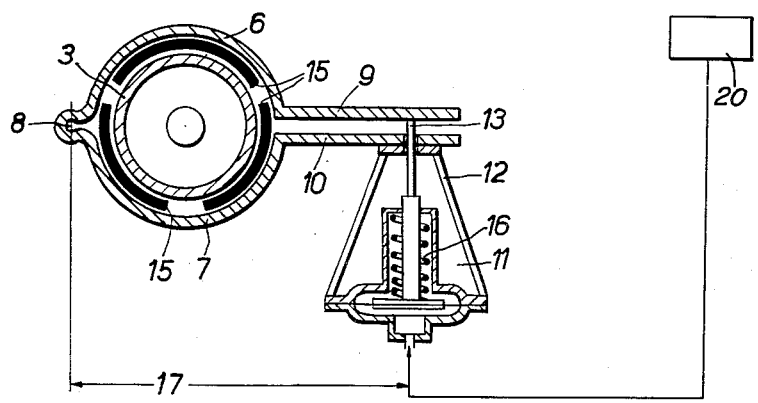

2,971,741

RETAINING MEANS FOR DIAPHRAGM VALVES OPERATED BY COMPRESSED AIR

Kurt Eppler, Leverkusen, and Franz J. Kollbach, Koln-Dunnwald, Germany, assignors to Farbenfabriken Bayer Aktiengesellschaft, Leverkusen, Germany, a corporation of Germany Filed July 14, 1958, Ser. No. 748,470

Claims priority, application Germany July 20, 1957

4 Claims. (Cl. 251—61)

The invention relates to a retaining means for valves having a spring-loaded diaphragm actuated by compressed air. With diaphragm valves of this constructional form, the valve spindle is adjusted pneumatically with a variably controlled air pressure between 0 and 1 atm. against the action of a valve spring which is preferably arranged in the diaphragm housing.

Depending on the construction of the valve, the latter is opened or closed by means of the valve spring when there is a failure in the controlled air pressure. By this means, the continuous progress of production plant incorporating valves is interrupted when there is a failure in the controlled air pressure. In order to overcome this disadvantage, it has already been proposed to arrest the valve spindle in the actual operative position by simply blocking the air control pipe in front of the diaphragm. It is not possible to retain this position reliably in this way because of the difficulties in sealing the air shut-off valves. It has now been found that in the event of the failure of the control air, the spindle can be satisfactorily held in the actual operative position against the action of the valve spring if the valve spindle is provided according to the invention with a clamping means which is coupled to a spring-loaded auxiliary diaphragm connected to the unreduced control air of the diaphragm valve. The clamping means consists of a cylinder which is fixed to the valve spindle and around which are arranged movable clamping jaws, the arms of which are coupled to the auxiliary diaphragm, the diaphragm housing being fixed to one arm and the diaphragm spindle to the other arm. With a failure in the control air, the tensioned spring suddenly tightens one clamping jaw against the other, so that the cylinder and the valve spindle fixed thereon are instantaneously arrested in their position against the action of the valve spring. As soon as the control air is again available, the clamping jaws are detached from the cylinder, so that the cylinder with the valve spindle can again be freely adjusted. One embodiment of the invention is illustrated diagrammatically in the drawing, Figure 1 being a longitudinal section and Figure 2 a cross-section. Fixed to the spindle 1 of the valve 2 is a cylinder 3. The closing and opening of the valve is effected by means of the diaphragm 5 which is controlled by compressed air and is provided with a counter-pressure spring 4. The cylinder 3 is enclosed by clamping jaws 6 and 7 which are rotatable about a common pivot 8. A diaphragm driving means 11 is so fixed to the arms 9 and 10 of the clamping jaws that the diaphragm housing 12 is connected fast to the arm 10 and the spindle 13 is connected fast to the arm 9. The diaphragm drive means 11 is connected to the unreduced control air (for example 2 atm.), via a conduit line communicating the unreduced control air pressure from its source 20 to the surface of the auxiliary diaphragm of diaphragm drive means 11. On the other hand, control air pressure variable between 0 and 1 atm. is connected to the union 14 of the diaphragm valve 5. This variable control air is obtained from the same source 20 as that conducted to drive means 11 but is first reduced in pressure (to between 0 and 1.0 atmospheres) before being passed to union 14. For this purpose, said control air from said source may be conveniently passed, for example, to a pressure reduction valve means 19 whereby the pressure is intermediately reduced and thence to a pneumatic regulator means 18 wherein pressure is finally reduced to from 0 to 1.0 atmosphere as aforesaid. Each pressure value within this range brings about a certain position of the valve 2, e.g. completely opened at 0 atmosphere, half opened at 0.5 atmosphere, and closed at 1.0 atmosphere. When air pressure is available, the clamping jaws 9 and 10 are opened and the valve spindle of the diaphragm valve is adjustable. On failure of the compressed air, the clamping jaws which are provided with linings 15 are pressed against the cylinder 3 and retain the spindle 1 fixed to the cylinder in the prevailing operative position. The clamping force is dependent on the closing force of the spring 16 of the diaphragm valve 11, the leverage 17 and the surface area of the linings 15. The valve spindle can be retained in any of its many positions. The retaining means can also be used in conjunction with a positioning means.

We claim:

1. An automatic flow regulating device comprising a housing, a diaphragm forming with said housing a fluid pressure chamber having a port therein for receiving a control pressure fluid, a spring engaging the side of the diaphragm opposite said chamber, a valve casing having a valve member therein for controlling a flow passage through said casing, a valve spindle operatively engaged between said diaphragm and said valve member, said spring urging said diaphragm toward the valve open position, releasable clamping means engageable with said spindle for preventing movement thereof, second means responsive to said control pressure fluid connected to said clamping means for disengaging said clamping means from said spindle, and spring means urging said second means in a direction to engage said clamping means whereby upon failure of said control fluid pressure said clamping means will engage said spindle to prevent movement thereof.

2. In a device, according to claim 1, wherein said releasable clamping means includes a pair of resiliently connected clamping members, said valve spindle being provided with a cylinder means coaxially positioned thereon, said clamping members being disposed about said cylinder means and being adapted to clampingly engage said cylinder means upon failure of said pressure and thereby prevent displacement of said valve spindle.

3. In a device, according to claim 2, wherein said second fluid pressure means comprises an auxiliary spring loaded diaphragm and spindle means within a housing therefor, one of said clamping members being coupled to the spindle thereof and the other of said clamping members being coupled to the housing thereof, said auxiliary diaphragm and spindle means being actuatable against the action of the auxiliary diaphragm spring by said control pressure, whereby upon failure of said pressure said auxiliary spring causes said clamping members to clampingly engage said cylinder means.

4. An improvement, according to claim 3, wherein said clamping members are resiliently inter-connected at one end portion via a common arcuate portion, the other end portion of said one of said clamping members providing the coupling of said one of said clamping members to the spindle of said auxiliary spring loaded diaphragm and spindle means, the other end portion of said other of said clamping members providing the coupling of said other of said clamping members to the housing of said auxiliary means, the intermediate portions of said clamping members being arcuately shaped to clampingly engage a portion of the outer surface of said cylinder means.

References Cited in the file of this patent

UNITED STATES PATENTS

| | | |
|---|---|---|
| 2,339,469 | Emanuel | Jan. 18, 1944 |
| 2,479,454 | Annin | Aug. 16, 1949 |
| 2,601,578 | Witt | June 24, 1952 |